United States Patent
Yamagishi et al.

(10) Patent No.: US 6,397,151 B1
(45) Date of Patent: May 28, 2002

(54) IMPULSE FORCE ESTIMATING DEVICE, IMPULSE FORCE ESTIMATING METHOD, AND MEDIUM STORING IMPULSE FORCE ESTIMATION PROGRAM

(75) Inventors: Masakatsu Yamagishi, Akiruno; Chikara Miyaji, Tsukuba, both of (JP)

(73) Assignees: Casio Computer Co., Ltd., Tokyo; Chikara Miyagi, Tsukuba, both of (JP)

( * ) Notice: Subject to any disclaimer, the term of this patent is extended or adjusted under 35 U.S.C. 154(b) by 0 days.

(21) Appl. No.: 09/230,963

(22) PCT Filed: Jun. 10, 1998

(86) PCT No.: PCT/JP98/02559
§ 371 (c)(1),
(2), (4) Date: Feb. 4, 1999

(87) PCT Pub. No.: WO98/57183
PCT Pub. Date: Dec. 17, 1998

(30) Foreign Application Priority Data

Jun. 11, 1997 (JP) ............................................. 9-153513

(51) Int. Cl.[7] ........................... G01L 5/00; G01P 15/04; G01P 15/09
(52) U.S. Cl. ..................... 702/41; 73/1.37; 73/12.04; 73/514.01; 73/514.34; 73/492; 702/141; 463/8; 482/83; 482/84
(58) Field of Search ................ 702/41, 141; 73/514.34, 73/493, 770, 514.01, 12.01, 1.37; 463/8; 482/44, 83, 110; 473/212, 213

(56) References Cited

U.S. PATENT DOCUMENTS

| 4,023,396 A | * | 5/1977 | Yakshin | 73/12 |
| 4,027,535 A | * | 6/1977 | Swanson | 73/381 |
| 4,699,379 A | | 10/1987 | Chateau et al. | 273/54 |
| 5,233,544 A | | 8/1993 | Kobayashi | 364/566 |
| 5,441,256 A | | 8/1995 | Hackman | 273/77 |
| 5,672,809 A | * | 9/1997 | Brandt | 73/12.01 |
| 5,978,972 A | * | 11/1999 | Stewart et al. | 2/422 |
| 6,122,959 A | * | 9/2000 | Hoshal et al. | 73/489 |
| 6,183,365 B1 | * | 2/2001 | Tonomura et al. | 463/36 |

FOREIGN PATENT DOCUMENTS

| DE | 44 26302 | 2/1996 |
| WO | WO 91/06348 | 5/1991 |

* cited by examiner

Primary Examiner—Marc S. Hoff
Assistant Examiner—Paul Kim
(74) Attorney, Agent, or Firm—Frishauf, Holtz, Goodman, Langer & Chick, P.C.

(57) ABSTRACT

When a person wearing the wristwatch device (11) on his or her dominant arm has struck a blow, an acceleration sensor (12) senses acceleration at regular intervals of time, extracts accelerations x1 to x20 sensed at 20 points in front of the hit point H at which the sensed acceleration changes from positive to negative, and stores them in a RAM (20). The impulse force is calculated by multiplying the accelerations x1 to x20 at the 20 points in front of the hit point H by the weighting coefficients determined on the basis of the accelerations sensed in a trial performance and the actually measured impulse force and stored in a ROM (19). Therefore, the impulse force can be estimated accurately without actually striking a secured object.

20 Claims, 7 Drawing Sheets

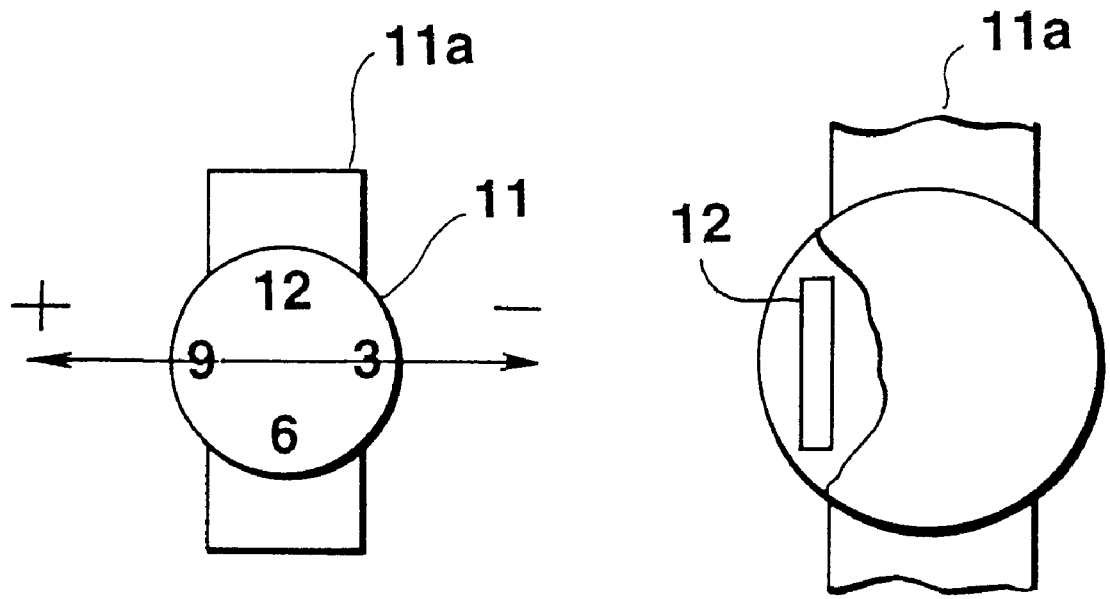

FIG.5

| | |
|---|---|
| 19a — AVERAGE VALUE OF ACCELERATIONS AT 20 POINTS IN KARATE GROUP INVERSE MATRIX OF COVARIANCE MATRIX | COEFFICIENTS a1 TO a20 AND CONSTANT C1 IN WEIGHT REGRESSION EQUATION FOR KARATE GROUP |
| 19b — AVERAGE VALUE OF ACCELERATIONS AT 20 POINTS IN BOXING GROUP INVERSE MATRIX OF COVARIANCE MATRIX | COEFFICIENTS b1 TO b20 AND CONSTANT C2 IN WEIGHT REGRESSION EQUATION FOR BOXING GROUP |
| 19c — AVERAGE VALUE OF ACCELERATIONS AT 20 POINTS IN KUNG FU GROUP INVERSE MATRIX OF COVARIANCE MATRIX | COEFFICIENTS c1 TO c20 AND CONSTANT C3 IN WEIGHT REGRESSION EQUATION FOR KUNG FU GROUP |
| 19d — AVERAGE VALUE OF ACCELERATIONS AT 20 POINTS IN AMATEUR GROUP INVERSE MATRIX OF COVARIANCE MATRIX | COEFFICIENTS d1 TO d20 AND CONSTANT C4 IN WEIGHT REGRESSION EQUATION FOR AMATEUR GROUP |

FIG.6

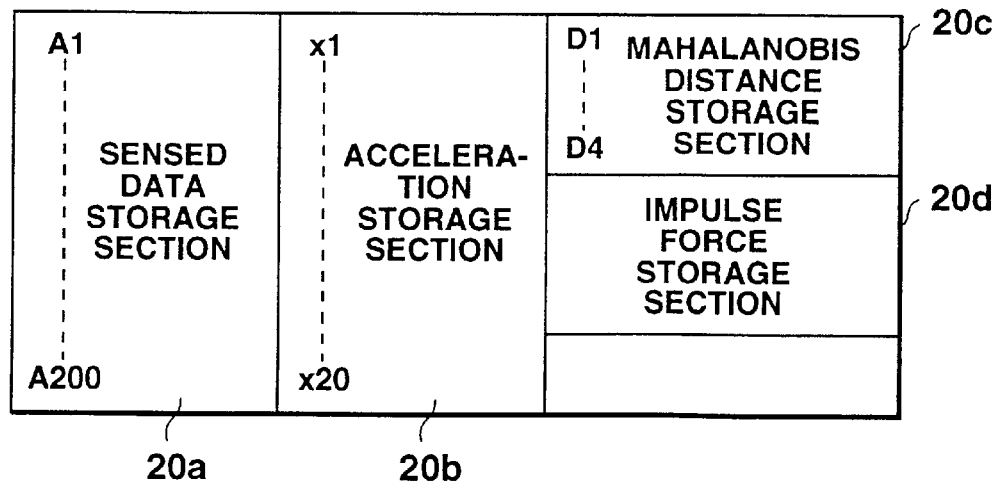

IMPULSE FORCE ESTIMATING DEVICE, IMPULSE FORCE ESTIMATING METHOD, AND MEDIUM STORING IMPULSE FORCE ESTIMATION PROGRAM

TECHNICAL FIELD

This invention relates to an impulse force estimating device and impulse force estimating method for measuring impulse force associated with striking techniques in, for example, martial arts, and a storage medium which stores an impulse force estimating program.

BACKGROUND ART

Flat force platforms have been used to measure impulse force accompanying striking techniques in combative sports, including karate, boxing, and kung fu.

This type of force platform is composed of piezoelectric elements sandwiched between metal plates. The force platform is fixed rigidly to a wall, such as a concrete wall. Striking the platform produces an electric signal, which is used to measure the impulse force.

Since the force platform used in the conventional impulse force measuring techniques is fixed rigidly to the wall, the shock resulting from a blow acts directly on the arm of the striker, which might hurt him.

To avoid such injury, the person whose impulse force is being measured might unconsciously pull his punches when hitting the force platform. This causes the problem of preventing the impulse force from being measured correctly in proportion to the striking force the striker actually possesses.

Furthermore, since the force platform used in the conventional impulse force measuring techniques is fixed rigidly to the wall, mass conditions related to impact are quite different from those for the case where the human body, the original target in striking techniques, is targeted for a blow. This causes another problem: namely, the impulse force measured using a force platform is quite different from the impulse force which would actually act on the human body.

SUMMARY OF THE INVENTION

It is, accordingly, an object of the present invention to provide an impulse force estimating device and impulse force estimating method capable of measuring impulse force without striking an object, and a storage medium that stores an impulse force estimating program.

An impulse force estimating device according to the present invention comprises an acceleration sensing unit which is attached to a human body and senses the acceleration of movement of the human body and an impulse force calculating unit for calculating impulse force on the basis of accelerations sensed before the time the direction of acceleration sensed by the acceleration sensing unit reverses as a result of the movement of the human body.

Therefore, it is possible to estimate the impulse force correctly without striking an object.

BRIEF DESCRIPTION OF DRAWINGS

FIG. 1A is a front view of a wristwatch device in connection with an embodiment of an impulse force estimating device according to the present invention, and FIG. 1B shows the installation location of an acceleration sensor in the wristwatch device;

FIG. 5 shows the contents of data previously stored in the calculation data storage section in the ROM of FIG. 4;

FIG. 6 illustrates the structure of the impulse force measuring mode data register in the RAM of FIG. 4;

BEST MODE OF CARRYING OUT THE INVENTION

Hereinafter, referring to the accompanying drawings, an embodiment of the present invention will be explained.

FIG. 1A is a front view of a wristwatch device in connection with an embodiment of an impulse force estimating device according to the present invention. FIG. 1B shows the installation location of an acceleration sensor in the wristwatch device.

A watch body 11 has a similar size to that of an ordinary wristwatch and allows a person to wear it on his wrist or ankle with a wrist band 11a. An electronic circuit for supervising various clock functions and an acceleration sensor 12 are provided in the watch body 11.

Figure 2A:
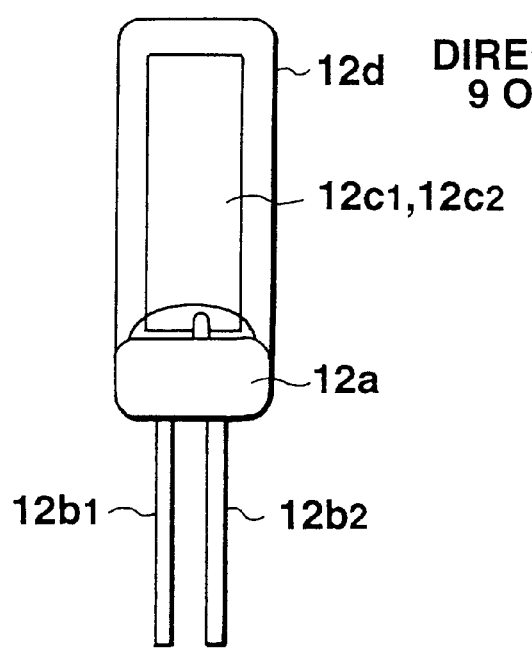
FIG. 2A shows the structure of an acceleration sensor installed on the wristwatch device of FIG. 1A.
Figure 2B:
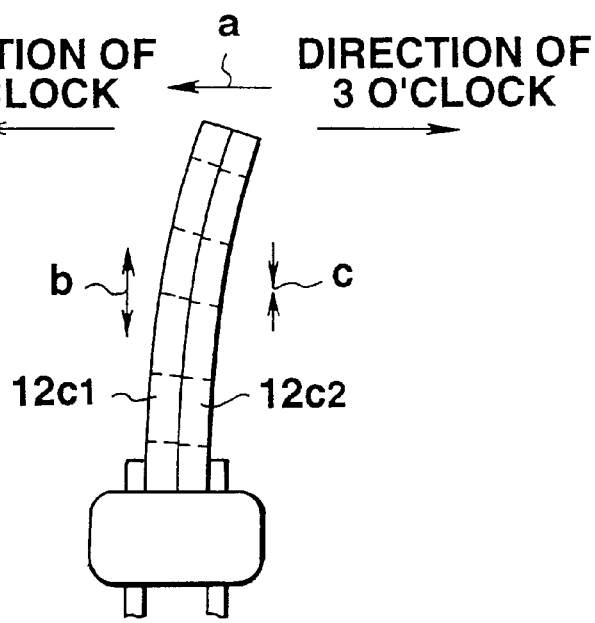
FIG. 2B shows the principle of the acceleration sensor.

FIG. 2A shows the structure of the acceleration sensor 12 installed on the wristwatch device. FIG. 2B shows the principle of the acceleration sensor 12.

The acceleration sensor 12 is a piezoelectric acceleration sensor. In the acceleration sensor 12, two leads 12b1 and 12b2 fixed to a base 12a are soldered respectively to the surfaces of two piezoelectric ceramic plates (piezoelectric elements) 12c1 and 12c2 laminated together. The soldered portions and the lower portions of the piezoelectric ceramic plates 12c1 and 12c2 are fixed to the base 12a with adhesive. All of the resulting structure is covered with a metal case 12d.

The two piezoelectric ceramic plates 12c1 and 12c2 are laminated together with their polarity opposite to each other. In FIG. 2, they are laminated together in a such manner that the ceramic plate 12c1 on the left has the negative polarity at the left surface and the positive polarity at the right surface when the plate 12c1 extends as shown by arrow b, whereas the ceramic plate 12c2 on the right has the negative polarity at the left surface and the positive polarity at the right surface when it contracts as shown by arrow c.

When acceleration acts in the direction of arrow a, the inertial force causes bends in the piezoelectric ceramic plates 12c1 and 12c2 as shown by arrows b and c, which produces voltage signals corresponding to the polarization at the right and left surfaces of the plates. The voltage signals are outputted via the leads 12b1 and 12b2.

As acceleration acting on the acceleration sensor 12 is greater, bends in the piezoelectric ceramic plates 12c1 and 12c2 become larger and therefore higher voltages are generated. As a result, the voltage signals proportional to the acceleration are outputted.

The acceleration sensor 2 is provided so as to correspond to the position of nine o'clock on the watch body 11. The direction of the sensitivity of the sensor 12 is set as follows.

In a case where the watch body 11 moves in the direction from three o'clock to nine o'clock, when the speed is on the increase, a positive voltage is outputted in proportion to the magnitude of an increase in the speed, whereas when the speed is on the decrease, a negative voltage is outputted in proportion to the magnitude of a decrease in the speed.

Figure 3:
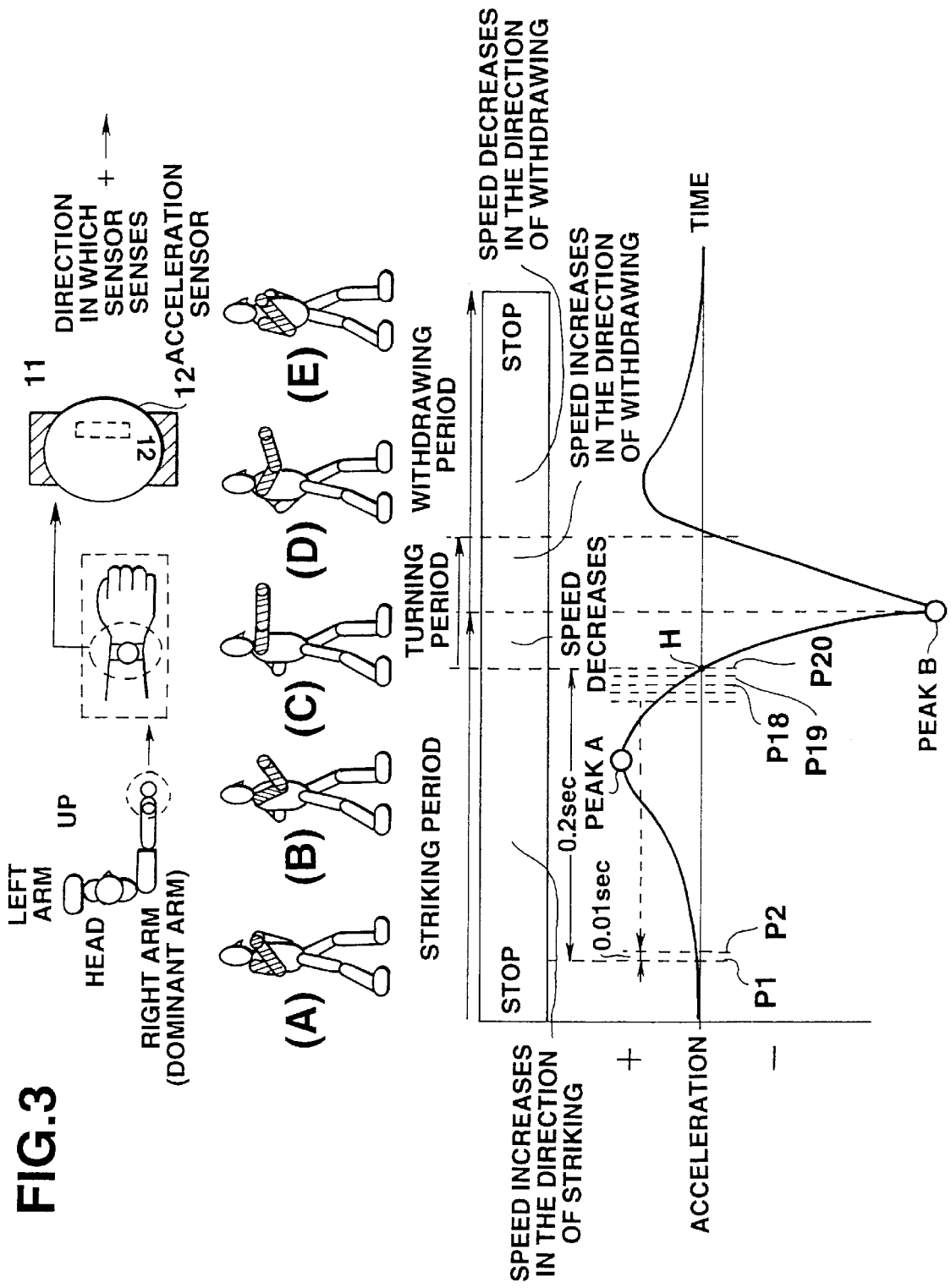
FIG. 3 shows how the acceleration sensor senses acceleration resulting from the movement of a person wearing the wristwatch device of FIG. 1A.

FIG. 3 is a pictorial diagram to help explain how the acceleration sensor 12 senses acceleration with no actual blow in the striking action of the person wearing the wristwatch device (the striking action characterized by stretching out the elbow or in that the fist moves almost linearly toward the object).

For example, when the person puts the watch body 11 on the right arm, his dominant arm, and strikes a blow as shown in (A) to (E) of FIG. 3, the voltage generated by the acceleration sensor 12 is sensed in the form of a positive voltage proportional to an increase in the speed in the direction of striking during the striking period (before the hit point H) corresponding to (A) to (C). In the turning period where the blow has reached the maximum (after the hit point H), the voltage generated by the sensor 12 is sensed in the form of the negative highest peak voltage.

It is at peak B shown in FIG. 3 that the acceleration absolute value becomes the largest throughout the series of operations.

As seen from that the value of the acceleration is negative, the magnitude of peak B shows the magnitude of a decrease in the speed at which the person stretches out his arm in the striking action. Namely, the more suddenly the stretched-out arm stops, the larger absolute value peak B has.

A positive acceleration appearing before that reflects the magnitude of an increase in the speed at which the person stretches out his arm. The changes in the magnitude largely depend on the pattern of the moving structure of the arm. They also reflect the moving structure of part of the body other than the arms. Variations in the acceleration of the part with time are closely related to the magnitude of impulse force caused as the final result of movement.

With the embodiment of the present invention, more accurate impulse force is estimated using accelerations x1 to x20 sensed at 20 points P1 to P20 at intervals of 0.01 second for 0.2 second before the hit point H.

Acceleration resulting from a blow has different effects on the magnitude of impulse force, depending on the sense timing. For example, since acceleration at the beginning of the striking action has little effect on the magnitude of impulse force and acceleration immediately before the impact has great effect, a different weight is given to each of the 20 sensed accelerations x1 to x20.

Specifically, many examinees are made to try striking blows beforehand. On the basis of accelerations sensed at intervals of 0.01 second at 20 points in front of the hit point H and the impulse force of actual blows measured under the mass conditions for a specific section of the body, a target section in strike techniques, a weight regression equation containing 20 variable terms and one constant term as shown by equation (1) is derived.

Twenty accelerations sensed at intervals of 0.01 second at 20 points in front of the hit point H in a striking action involving no actual blow are extracted and substituted into the 20 variables in the equation. On the basis of the result, the impulse force is estimated.

$$\text{Impulse force} = a1 \cdot x1 + a2 \cdot x2 + \ldots + a20 \cdot x20 + C \quad (1)$$

The coefficients and constants in the 20 variable terms in the equation vary depending on the type of sport combative, such as karate, boxing, of kung fu. The difference in technique between events is considered to be the difference in contribution of acceleration to impulse force between times. Therefore, the 20 coefficients are taken as weighting coefficients for acceleration at the respective times in each event.

Specifically, if weighting coefficients and a constant to be set in a weight regression equation for karate are a1 to a20 and C1 respectively, weighting coefficients and a constant to be set in a weight regression equation for boxing are b1 to b20 and C2 respectively, weighting coefficients and a constant to be set in a weight regression equation for kung fu are c1 to c20 and C3 respectively, and weighting coefficients and a constant to be set in a weight regression equation for amateur are d1 to d20 and C4 respectively, impulse force accompanying a karate blow will be determined using equation (2), impulse force accompanying a boxing blow will be determined using equation (3), impulse force accompanying a kung fu blow will be determined using equation (4), and impulse force accompanying an amateur blow will be determined using equation (5).

$$\text{Impulse force (karate)} = a1 \cdot x1 + a2 \cdot x2 + \ldots + a20 \cdot x20 + C1 \quad (2)$$

$$\text{Impulse force (boxing)} = b1 \cdot x1 + b2 \cdot x2 + \ldots + b20 \cdot x20 + C2 \quad (3)$$

$$\text{Impulse force (kung fu)} = c1 \cdot x1 + c2 \cdot x2 + \ldots + c20 \cdot x20 + C3 \quad (4)$$

$$\text{Impulse force (amateur)} = d1 \cdot x1 + d2 \cdot x2 + \ldots + d20 \cdot x20 + C4 \quad (5)$$

Which one of karate, boxing, kung fu, and amateur a blow by an examinee belongs to is determined in the following procedure.

The average value of accelerations sensed at intervals of 0.01 second at 20 points in front of the hit point H for each type of blow in a trial performance of many examinees is found using equation (6). Twenty accelerations sensed in a trial performance of many examinees are taken as independent 20 variables to determine a covariance. Then, a covariance matrix with 20 rows and 20 columns is created. Moreover, the inverse matrix of the covariance matrix is created.

| Examinee 1 | $\{x1, x2, x3, \ldots x18, x19, x20\}$ |
|---|---|
| $\vdots$ | $\vdots$ |
| Examinee $N$ | $\{x1, x2, x3, \ldots x18, x19, x20\}$ |
| (The average of all examinees at each time) | $\{x1, x2, x3, \ldots x18, x19, x20\}$ |

When accelerations x1 to x20 sensed at 20 points in front of the hit point H accompanying a blow by an examinee have been obtained, the difference between each of the 20 accelerations x1 to x20 sensed at the 20 points and each of the average accelerations at the 20 points (refer to equation (6)) previously determined in a trial performance of karate is found. This gives a matrix with one row and 20 columns as expressed by equation (7) and a matrix with 20 rows and one column as expressed by equation (8).

$$[X1-x1, X2-x2, \ldots, X20-x20] \quad (7)$$

$$\begin{bmatrix} X1 - x1 \\ X2 - x2 \\ \vdots \\ X20 - x20 \end{bmatrix} \quad (8)$$

Using equation (9), Mahalanobis distance D is found on the basis of each matrix according to the difference between the sensed accelerations of the examinees and the average acceleration in a trial performance of karate and the previously obtained inverse matrix of the covariance matrix in a trial performance of karate.

$$D = [X1 - x1, X2 - x2, \ldots, X20 - x20] \, [A] \begin{bmatrix} X1 - x1 \\ X2 - x2 \\ \vdots \\ X20 - x20 \end{bmatrix} \quad (9)$$

A: the inverse matrix of the covariance matrix with 20 rows and 20 columns

Mahalanobis distance D is determined for each type of blow, such as karate, boxing, kung fu, or amateur. Sensed accelerations x1 to x20 resulting from blows by the examinees are determined to belong to a type of blow whose Mahalanobis distance D is the smallest.

Specifically, variations in the acceleration with time in a trial performance of each type of blow, such as karate, boxing, kung fu, or amateur have a distinctive standard pattern. It is determined which of the four standard patterns variations in the sensed acceleration resulting from the blow of the examinee most closely resemble.

Then, impulse force accompanying the blow of the examinee is determined using the weight regression equations (refer to equations (2) to (5)) containing the weighting coefficients and constants for each sensed acceleration previously set according to the determined type of blow.

Figure 4:
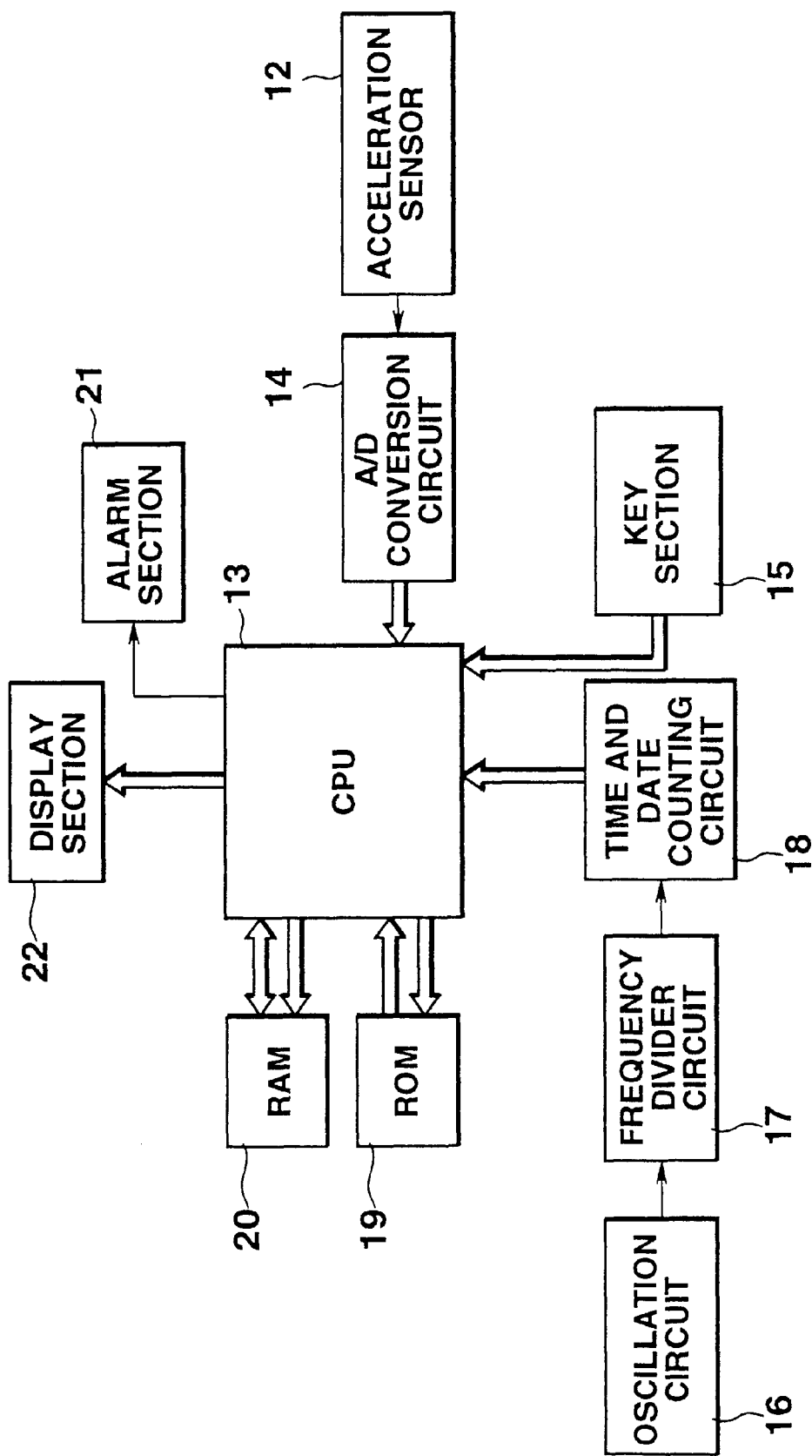
FIG. 4 is a block diagram of the electronic circuit of the wristwatch device of FIG. 1A.

FIG. 4 is a block diagram of the electronic circuit in the wristwatch device.

The electronic circuit in the wristwatch device is provided with a CPU 13.

The CPU 13 starts the system program previously stored in a ROM 19 or the program read from an external storage medium by an external data read section (not shown) and controls the operation of each section of the circuit on the basis of the acceleration data inputted by an acceleration sensor 12 via an A/D conversion circuit 14, the key operation signal from a key section 15, or the time and date counting data inputted from an oscillation circuit 16 via a frequency divider 17 and a time and date counting circuit 18. Not only the A/D conversion circuit 14, key section 15, time and date counting circuit 18, ROM 19, and external data read section but also a RAM 20, an alarm section 21, and a display section 22 are connected to the CPU 15.

The A/D conversion circuit 14 converts the voltage signal proportional to the sensed acceleration supplied from the acceleration sensor 12 into digital data and sends the digital data to the CPU 13. Specifically, the A/D conversion circuit 14 converts the voltage signal proportional to acceleration in the range from −15 G to +15 G sensed by the acceleration sensor 12 into digital data in the range of −512 to +512 and sends the digital data to the CPU 13.

The key section 15 is provided with not only a mode change key for switching between the basic clock mode and the impulse force measuring mode in the wristwatch device but also more than one key used to execute various function in each operation mode.

Specifically, in the basic clock mode, for example, the present date and time data according to the time and date counting data supplied from the time and date counting circuit 18 are displayed on the display section 22. In the impulse force measuring mode, impulse force is measured and displayed on the basis of the acceleration data sensed by the acceleration sensor 12 as a result of, for example, the user's striking action.

In the ROM 19, a system program that supervises all the control of the electronic circuit has been stored beforehand. Also in the ROM 19, a subprogram that supervises control according to each of the basic clock mode and impulse force measuring mode has been stored. Furthermore, preset table data have been stored in the ROM 19.

FIG. 5 shows the contents of the data previously stored in the calculation data storage section in the ROM 19 of the wristwatch device.

The calculation data storage section of the ROM 19 includes a karate data storage section 19*a*, a boxing data storage section 19*b*, a kung fu data storage section 19*c*, and an amateur data storage section 19*d*. The karate data storage section 19*a* stores weighting coefficients a1 to a20 for the respective sensed accelerations at the 20 points and constant C1 determined on the basis of the accelerations sensed at intervals of 0.01 second at the 20 points in front of the hit point H obtained in a karate trial performance of many examinees and the impulse force of actual blows measured under mass conditions for a specific section of a human body, a target section in striking techniques. The storage section 19*a* also stores the average value (see number 1) for each of the accelerations sensed at intervals of 0.01 second at the 20 points in front of the hit point H obtained in the karate trial performance of many examinees and the inverse matrix of the corresponding covariance matrix with 20 rows and 20 columns.

The karate data storage section 19*b* stores weighting coefficients b1 to b20 for the respective sensed accelerations at the 20 points and constant C2 determined on the basis of the accelerations sensed at intervals of 0.01 second at the 20 points in front of the hit point H obtained in a boxing trial performance of many examinees and the impulse force of actual blows measured under mass conditions for a specific section of a human body, a target section in striking techniques. The storage section 19*b* also stores the average value for each of the accelerations sensed at intervals of 0.01 second at the 20 points in front of the hit point H obtained in the boxing trial performance of many examinees and the inverse matrix of the corresponding covariance matrix with 20 rows and 20 columns.

The kung fu data storage section 19*c* stores weighting coefficients c1 to c20 for the respective sensed accelerations at the 20 points and constant C3 determined on the basis of the accelerations sensed at intervals of 0.01 second at the 20 points in front of the hit point H obtained in a kung fu trial performance of many examinees and the impulse force of actual blows measured under mass conditions for a specific section of a human body, a target section in striking techniques The storage section 19*c* also stores the average value for each of the accelerations sensed at intervals of 0.01 second at the 20 points in front of the hit point H obtained in the kung fu trial performance of many examinees and the inverse matrix of the corresponding covariance matrix with 20 rows and 20 columns.

The amateur data storage section 19*d* stores weighting coefficients d1 to d20 for the respective sensed accelerations at the 20 points and constant C4 determined on the basis of the accelerations sensed at intervals of 0.01 second at the 20 points in front of the hit point H obtained in an amateur trial performance of many examinees and the impulse force of actual blows measured under mass conditions for a specific section of a human body, a target section in striking techniques. The storage section 19*d* also stores the average value for each of the accelerations sensed at intervals of 0.01 second at the 20 points in front of the hit point H obtained in the amateur trial performance of many examinees and the inverse matrix of the corresponding covariance matrix with 20 rows and 20 columns.

FIG. 6 shows the structure of the impulse force measuring mode data register in the RAM 20 of the wristwatch device.

The impulse force measuring mode data register in the RAM 20 includes a sensed data storage section 20a, an acceleration storage section 20b, a Mahalanobis distance storage section 20c, and an impulse force storage section 20d. The sense data storage section 20a stores 200 acceleration digital data items A1 to A200 extracted from the acceleration sensor 12 via the A/D conversion circuit 14 at intervals of 0.01 second for two seconds in measuring impulse force.

Of 200 acceleration digital data items A1 to A200 stored in the sensed data storage section 20a, the absolute values of acceleration digital data items at 20 points in front of the hit point H (see FIG. 3) are converted into acceleration data items x1 to x20 (m/s$^2$), and stored in the acceleration storage section 20b. The hit point H is a point where the polarity of an acceleration data item reverses last before the acceleration whose absolute value is the largest is sensed (in the case of a right-handed person, the polarity changes from positive to negative).

The Mahalanobis distance storage section 20c stores Mahalanobis distances D1 to D4 for each type of blow (karate, boxing, kung fu, or amateur). The Mahalanobis distances D1 to D4 are calculated according to number 1 to number 4 on the basis of the sensed accelerations x1 to x20 at 20 points in front of the hit point H accompanying the striking actions of the examinees stored in the acceleration storage section 20b and the average accelerations at 20 points in a trial performance of each type of blow and the inverse matrix of the covariance matrix stored in the karate data storage section 19a to amateur data storage section 19d of the ROM 19.

Of the Mahalanobis distances D1 to D4 for each type of blow stored in the Mahalanobis distance storage section 20c, the type of blow whose Mahalanobis distances D1 to D4 have the smallest values is determined. Impulse force is calculated by substituting the sensed accelerations x1 to x20 at the 20 points in front of the hit point H accompanying blows by examinees stored in the acceleration storage section 20b into the weight regression equations (refer to equation 2 to equation 5) containing the weighting coefficients and constant for the determined type of blow stored in any one of the karate data storage section 19a to amateur data storage section 19d in the ROM 19. The calculated impulse force is stored in the impulse force storage section 20d as measured data.

Next, the impulse force measuring operation in the wristwatch device constructed described above will be explained.

Figure 7:
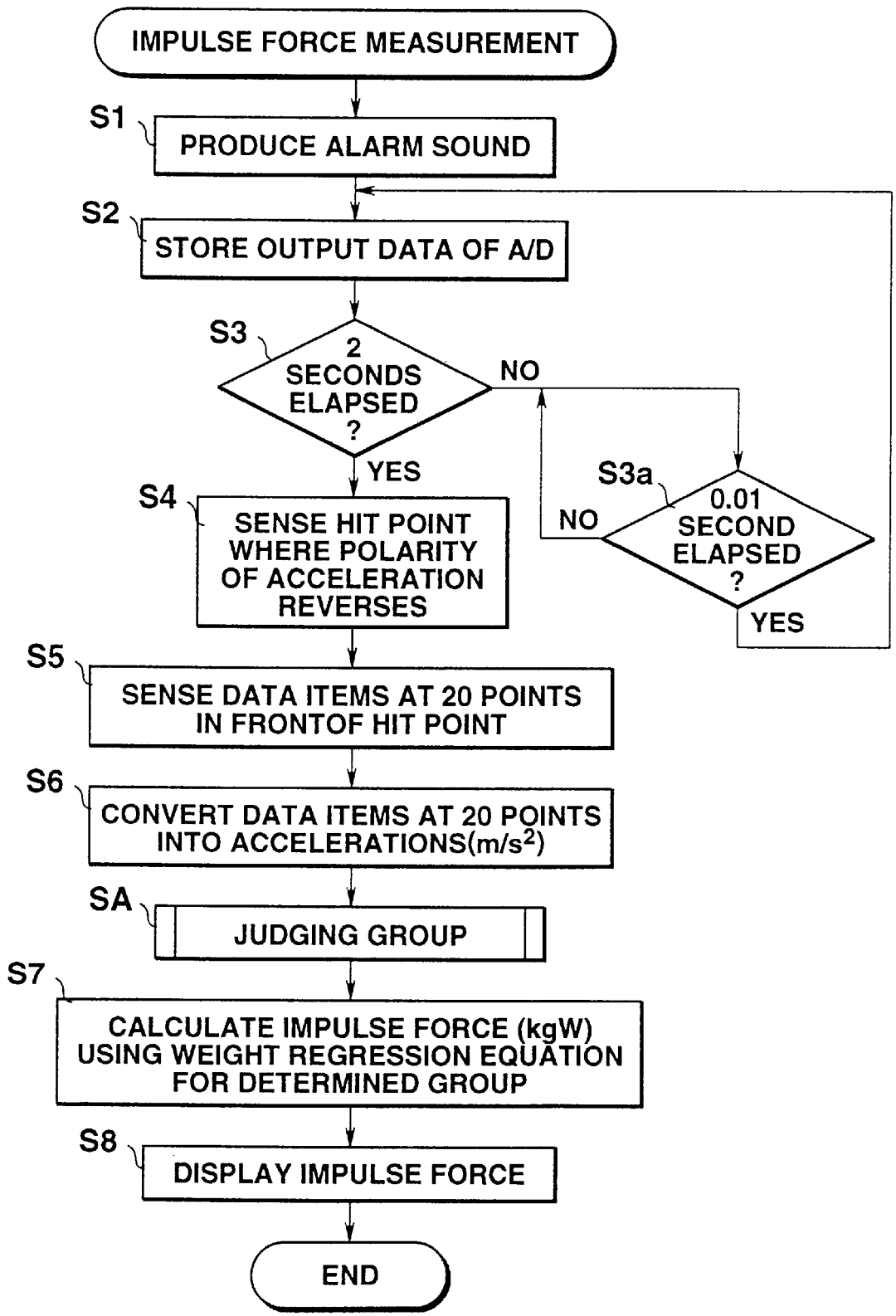
FIG. 7 is a flowchart for a measuring mode process in the impulse force measuring mode.

FIG. 7 is a flowchart for the measuring mode process in the impulse force measuring mode of the wristwatch device.

Figure 8:
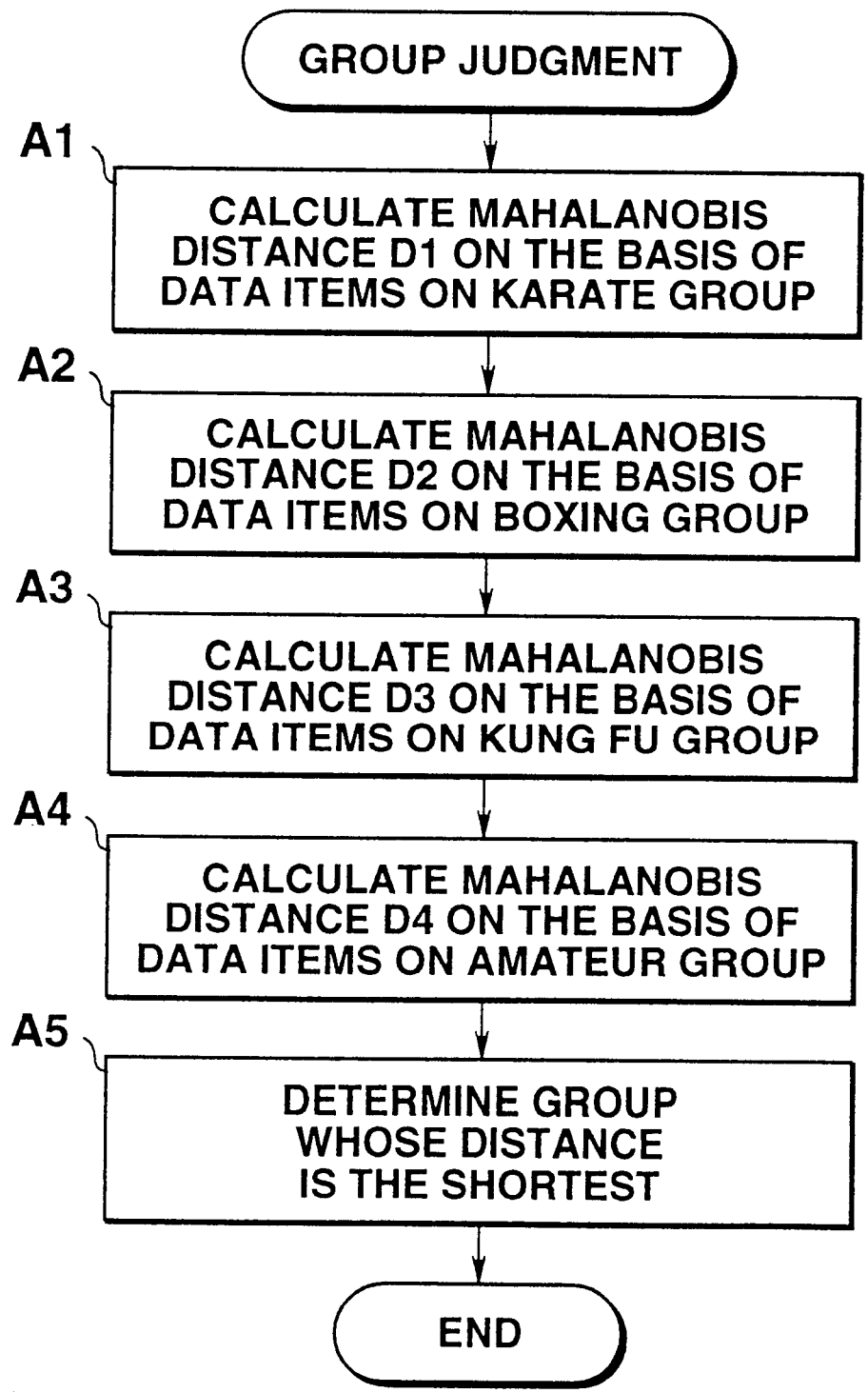
FIG. 8 is a flowchart for a type-of-blow (group) judging process accompanying the measuring mode process in the impulse force measuring mode.

FIG. 8 is a flowchart for the type-of-blow (group) judging process accompanying the measuring mode process in the impulse force measuring mode of the wristwatch device.

The operation of the mode change key on the key section 15 brings the CPU 13 into the impulse force measuring mode. This starts the impulse force measuring process of FIG. 7.

When the examinee operates the measurement key on the key section 15 to measure impulse force of his blow, the alarm section 21 produces alarm sound to let the user know the start of measurement. At the same time, the sampling of the voltage signal from the acceleration sensor 12 proportional to the acceleration resulting from the striking action of the examinee is started (step S1).

Specifically, when the examinee, in response to the alarm sound, stretches out his dominant arm wearing the watch body 11 to strike a blow, the acceleration digital data outputted from the acceleration sensor 12 via the A/D conversion circuit 14 is sampled at intervals of 0.01 second for two seconds. Then, 200 acceleration digital data items A1 to A200 sampled are stored in the sensed data storage section 20a in the RAM 20 (step S2, S3→S3a→S2).

Thus, 200 acceleration data items A1 to A200 have been stored in the sensed data storage section 20a in the RAM 20 for two seconds as a result of the striking of the examinee. Then, of the stored acceleration data items A1 to A200, the time at which the absolute values of the data values are the largest is determined. Thereafter, the hit point H (see FIG. 3) is detected at which the acceleration data value reverses last before the time the absolute value is the largest (in the case of a right-handed person, the data value changes from positive to negative). Then, 20 points P1 to P20 immediately before the hit point H are extracted (step S3→S4, S5).

Then, the absolute values of the 20 points P1 to P20 immediately before the hit point H extracted at step S5 are converted into acceleration data items x1 to x20 (m/s$^2$), which are stored in the acceleration storage section 20b in the RAM 20 (step S6).

To determine which one of karate, boxing, kung fu, and amateur the type of blow by the examinee belongs to, the type-of-blow (group) judging process of FIG. 8 is started (step SA).

First, on the basis of the sensed accelerations x1 to x20 at the 20 points in front of the hit point H accompanying the striking actions of the examinees stored in the acceleration storage section 20b in the RAM 20 and the average accelerations at the 20 points obtained in a karate trial performance stored in the karate data storage section 19a in the ROM 19 and the inverse matrix of the covariance matrix, Mahalanobis distance D1 in karate is calculated according to number 1 to number 4. The result is stored in the Mahalanobis distance storage section 20c in the RAM 20 (step A1).

Similarly, on the basis of the sensed acceleration x1 to x20 at the 20 points in front of the hit point H accompanying the striking actions of the examinees stored in the acceleration storage section 20b in the RAM 20 and the average accelerations at the 20 points obtained in a boxing trial performance stored in the boxing data storage section 19b in the ROM 19 and the inverse matrix of the covariance matrix, Mahalanobis distance D2 in boxing is calculated according to number 1 to number 4. The result is stored in the Mahalanobis distance storage section 20c in the RAM 20 (step A2).

Similarly, on the basis of the 20 sensed accelerations x1 to x20 at the 20 points in front of the hit point H accompanying the striking actions of the examinees stored in the acceleration storage section 20b in the RAM 20 and the average accelerations at the 20 points obtained in a kung fu trial performance stored in the kung fu data storage section 19c in the ROM 19 and the inverse matrix of the covariance matrix, Mahalanobis distance D3 in kung fu is calculated according to number 1 to number 4. The result is stored in the Mahalanobis distance storage section 20c in the RAM 20 (step A3).

Similarly, on the basis of the 20 sensed accelerations x1 to x20 at the 20 points in front of the hit point H accompanying the striking actions of the examinees stored in the acceleration storage section 20b in the RAM 20 and the average accelerations at the 20 points obtained in an amateur trial performance stored in the amateur data storage section 19d in the ROM 19 and the inverse matrix of the covariance matrix, Mahalanobis distance D4 in amateur is calculated according to number 1 to number 4. The result is stored in the Mahalanobis distance storage section 20c in the RAM 20 (step A4).

Of the Mahalanobis distances D1 to D4 for the four types of blow (karate, boxing, kung fu, and amateur) stored in the Mahalanobis distance storage section 20c in the RAM 20, the type of blow whose distance D is the shortest is determined to be the type of blow given by the examinee (step A5).

Then, according to the type-of-blow judging process (see FIG. 8), impulse force (Kg·W) is calculated using the weight regression equations (refer to equation 2 to equation 5) containing the weighting coefficients and constant for the sensed accelerations for each type of blow stored in the karate data storage section 19a to amateur data storage section 19d in the ROM 19. The calculation result is stored in the impulse force storage section 20d of the RAM 20 and displayed on the display section 22 (steps S7 and S8).

Specifically, in the type-of-blow judging process (see FIG. 8), for example, when the Mahalanobis distance D1 is the shortest, it is judged that the type of blow by the examinee is karate. In this case, on the basis of the sensed acceleration data items x1 to x20 at the 20 points in front of the hit point H accompanying the striking actions of the examinees stored in the acceleration storage section 20b of the RAM 20 and the weighting coefficients a1 to a20 for the sensed acceleration data items x1 to x20 and constant C1 stored in the karate data storage section 19a of the ROM 19, impulse force (Kg·W) is calculated using the weight regression equation (refer to equation 2) for karate. The calculation result is stored in the impulse force storage section 20d of the RAM 20 and displayed on the display section 22 (steps SA and S8).

Similarly, in the type-of-blow judging process (see FIG. 8), for example, when the Mahalanobis distance D2 is the shortest, it is judged that the type of blow by the examinee is boxing. In this case, on the basis of the sensed acceleration data items x1 to x20 at the 20 points in front of the hit point H accompanying the striking actions of the examinees stored in the acceleration storage section 2b of the RAM 20 and the weighting coefficients b1 to b20 for the sensed acceleration data items x1 to x20 and constant C2 stored in the boxing data storage section 19b of the ROM 19, impulse force (Kg·W) is calculated using the weight regression equation (refer to equation 3) for boxing. The calculation result is stored in the impulse force storage section 20d of the RAM 20 and displayed on the display section 22 (steps SA and S8).

Similarly, in the type-of-blow judging process (see FIG. 8), for example, when the Mahalanobis distance D3 is the shortest, it is judged that the type of blow by the examinee is kung fu. In this case, on the basis of the sensed acceleration data items x1 to x20 at the 20 points in front of the hit point H accompanying the striking actions of the examinees stored in the acceleration storage section 2b of the RAM 20 and the weighting coefficients c1 to c20 for the sensed acceleration data items x1 to x20 and constant C3 stored in the kung fu data storage section 19c of the ROM 19, impulse force (Kg·W) is calculated using the weight regression equation (refer to equation 4) for kung fu. The calculation result is stored in the impulse force storage section 20d of the RAM 20 and displayed on the display section 22 (steps SA, S7 and S8).

Similarly, in the type-of-blow judging process (see FIG. 8), for example, when the Mahalanobis distance D4 is the shortest, it is judged that the type of blow by the examinee is amateur. In this case, on the basis of the sensed acceleration data items x1 to x20 at the 20 points in front of the hit point H accompanying the striking actions of the examinees stored in the acceleration storage section 20b of the RAM 20 and the weighting coefficients d1 to d20 for the sensed acceleration data items x1 to x20 and constant C4 stored in the amateur data storage section 19d of the ROM 19, impulse force (Kg·W) is calculated using the weight regression equation (refer to equation 5) for amateur. The calculation result is stored in the impulse force storage section 20d of the RAM 20 and displayed on the display section 22 (steps SA, S7 and S8).

Accordingly, with the wristwatch device, when the person wearing the watch body 11 on his dominant arm strikes a blow, the acceleration sensor 12 on the watch body 11 senses acceleration at intervals of 0.01 second and sensed accelerations x1 to x20 at the 20 points in front of the hit point H at which the value of the sensed acceleration changes from positive to negative are extracted and stored in the acceleration storage section 20b of the RAM 20. Using the sensed accelerations x1 to x20 at the 20 points in front of the hit point H, the weight regression equations are solved to find impulse force. In the weight regression equations, the sensed accelerations x1 to x20 at the 20 points in front of the hit point H are multiplied by the weighting coefficients determined on the basis of the acceleration sensed in a trial performance and the actually measured impulse force and stored in the ROM 19 and are added with the weighting constant. This eliminates the necessity of actually striking a secured object. On the basis of the accelerations sensed at the 20 points immediately before the hit point H having a great effect on impulse force, more proper impulse force can be estimated.

Furthermore, with the wristwatch device, on the basis of the accelerations x1 to x20 sensed at the 20 points by the acceleration sensor 12 and stored in the acceleration storage section 20b of the RAM 20 and the average accelerations obtained in a trial performance of each of the four types of blow (karate, boxing, kung fu, and amateur) and stored in the ROM 19 and the inverse matrix of the covariance matrix, Mahalanobis distances D1 to D4 corresponding to the respective types of blow are calculated. From the calculation results, it is judge that the shortest distance D belongs to the present type of blow. At the same time, the sensed accelerations are multiplied by the weighting coefficients in the weight regression equation for each type of blow determined on the basis of the acceleration sensed in a trial performance of each type of blow and the actually measured impulse force and stored in the ROM 19 and are added with the weighting constant. In this way, impulse force is calculated. This makes it possible to determine the type of blow and find more accurate impulse force.

While in the embodiment, the type of blow by the examinee is determined on the basis of the Mahalanobis distances D1 to D4 for the respective types of blow and impulse force is found using the weight regression equation for each type of blow, the type of blow by the examinee may be specified from a key or by a key operation and a weight regression equation for each type of blow may be selectively used.

Furthermore, while in the embodiment, the person wears the watch body 11 on his dominant arm and measures impulse force caused by the thrusting of his fist, he may wear the watch body 11 on his ankle and measure impulse force caused by a kick.

The approaches explained in the embodiment, that is, the approaches, including the impulse force measuring process, shown in the flowcharts of FIGS. 7 and 8, may be stored in the form of programs executable on a computer, into external storage mediums, such as memory cards (e.g., ROM cards or RAM cards), magnetic disks (e.g., floppy disks or hard disks), optical disks (e.g., CD-ROMs or DVDs), or semiconductor memory. The external storage mediums may be distributed. A computer then reads the program recorded on the external storage medium at the recording medium read section. Under the control of the read program, the computer realizes the function of measuring impulse force explained in the embodiment and executes similar processes by the above-described approaches.

What is claimed is:

1. An impulse force estimating device comprising:
    acceleration sensing means to be attached to a human body, for sensing an acceleration of movement of the human body; and
    impulse force calculating means for calculating an impulse force based on more than one acceleration sensed by said acceleration sensing means prior to a reversal of a direction of the sensed accelerations.

2. The impulse force estimating device according to claim 1, wherein:
    said acceleration sensing means senses the acceleration of movement of the human body at regular intervals of time, and
    said impulse force calculating means includes:
        judging means for judging an acceleration reverse time when the sensed accelerations change from positive to negative as a result of a striking action of the human body, based on the acceleration of movement of the human body sensed at the regular intervals of time,
        extracting means for extracting more than one acceleration with a different timing before the acceleration reverse time judged by said judging means, and
        calculating means for calculating the impulse force based on the more than one acceleration extracted by said extracting means.

3. The impulse force estimating device according to claim 1, wherein said impulse force calculating means comprises means for, using a weight regression equation based on predetermined weighting coefficients and a constant for the sensed accelerations, calculating the impulse force by multiplying each of the sensed accelerations by said coefficients and adding the resulting values together, and further adding said constant to the addition result.

4. The impulse force estimating device according to claim 1, wherein said impulse force calculating means includes:
    judging means for judging a type of said striking action based on the accelerations sensed by said acceleration sensing means, and
    calculating means for, using a weight regression equation based on predetermined weighting coefficients and a constant differing according to the type of said striking action judged by the judging means, calculating the impulse force by multiplying each of the sensed accelerations sensed by said coefficients corresponding to said type of striking action and adding the resulting values together, and further adding said constant to the addition result.

5. The impulse force estimating device according to claim 4, wherein said judging means judges the type of said striking action based on a shortest Mahalanobis distance for individual types of striking actions calculated based on a difference between more than one average acceleration previously obtained for each type of striking action and more than one acceleration sensed by said acceleration sensing means and an inverse matrix of a covariance matrix.

6. The impulse force estimating device according to claim 1, wherein said acceleration sensing means and said impulse force calculating means are housed in a case with a band adapted to be attached to the human body.

7. The impulse force estimating device according to claim 6, further comprising:
    counting means for counting a present time, and
    time display means for displaying the present time counted by the counting means.

8. The impulse force estimating device according to claim 1, further comprising:
    impulse force display means for displaying the impulse force calculated by said impulse force calculating means.

9. An impulse force estimating method comprising:
    an acceleration sensing step of sensing an acceleration of movement of a human body as a result of a striking action of the human body, using acceleration sensing means attached to the human body; and
    an impulse force calculating step of calculating an impulse force based on more than one acceleration sensed prior to a reversal of a direction of the sensed accelerations.

10. The impulse force estimating method according to claim 9, wherein:
    said acceleration sensing step comprises a step of sensing the acceleration of movement of the human body at regular intervals of time, and
    said impulse force calculating step includes:
        a judging step of judging an acceleration reverse time when the sensed accelerations change from positive to negative as a result of the striking action of the human body, based on the acceleration of movement of the human body sensed at the regular intervals of time,
        an extracting step of extracting more than one acceleration with a different timing before the acceleration reverse time, and
        a calculating step of calculating the impulse force based on the more than one acceleration extracted in said extracting step.

11. The impulse force estimating method according to claim 9, wherein said impulse force calculating step is an impulse force calculating step which, using a weight regression equation based on predetermined weighting coefficients and a constant for the sensed accelerations, calculates said impulse force by multiplying each of the sensed accelerations by said coefficients and adding the resulting values together, and further adding said constant to the addition result.

12. The impulse force estimating method according to claim 9, wherein said impulse force calculating step includes:
    a judging step of judging a type of said striking action based on the accelerations sensed in said acceleration sensing step, and
    a calculating step which, using a weight regression equation based on predetermined weighting coefficients and a constant differing according to the type of said striking action judged in the judging step, calculates the impulse force by multiplying each of the accelerations sensed in said acceleration sensing step by said coefficients corresponding to said type of striking action and adding the resulting values together, and further adding said constant to the addition result.

13. The impulse force estimating method according to claim 12, wherein said judging step judges the type of said striking action based on a shortest Mahalanobis distance for individual types of striking actions calculated based on a difference between more than one average acceleration previously obtained for each type of striking action and more than one acceleration sensed in said acceleration sensing step and an inverse matrix of a covariance matrix.

14. The impulse force estimating method according to claim 9, further comprising a step of displaying said impulse force.

15. A program storage medium having program codes stored thereon that are readable by a computer for estimating an impulse force, comprising:

computer-readable program code means for enabling an acceleration of movement of a human body as a result of a striking action of the human body to be sensed with acceleration sensing means attached to the human body; and computer-readable program code means for calculating an impulse force based on more than one acceleration sensed prior to a reversal of a direction of the sensed accelerations.

16. The program storage medium according to claim 15, wherein:

said acceleration sensing means comprises computer-readable program code means for sensing accelerations resulting from the striking action of the human body at regular intervals of time, and said program storage medium further comprises:

computer-readable program code means for judging an acceleration reverse time when the sensed accelerations change from positive to negative as a result of the striking action of the human body, based on the acceleration of movement of the human body sensed at the regular intervals of time, computer-readable program code means for extracting more than one acceleration with a different timing before the acceleration reverse time, and computer-readable program code means for calculating the impulse force based on the extracted more than one acceleration.

17. The program storage medium according to claim 15, further comprising computer-readable code means for, using a weight regression equation based on predetermined weighing coefficients and a constant for the sensed accelerations, calculating the impulse force by multiplying each of the sensed accelerations by said coefficients and adding the resulting values together, and further adding said constant to the addition result.

18. The program storage medium according to claim 15, further comprising:

computer-readable program code means for judging the type of said striking action based on the sensed accelerations, and computer-readable program code means for, using a weight regression equation based on predetermined weighting coefficients and a constant differing according to the type of said striking action, calculating the impulse force by multiplying each of the sensed accelerations by said coefficients corresponding to said type of striking action and adding the resulting values together, and further adding said constant to the addition result.

19. The program storage medium according to claim 18, further comprising computer-readable program code means for judging the type of said striking action based on a shortest Mahalanobis distance for individual types of striking actions calculated based on a difference between more than one average acceleration previously obtained for each type of striking action and more than one sensed acceleration and an inverse matrix of a covariance matrix.

20. The program storage medium according to claim 15, further comprising computer-readable program code means for causing said impulse force to be displayed.

* * * * *